April 14, 1959     H. M. OGLE ET AL     2,881,786
CONVERTIBLE PNEUMATIC VALVE
Filed June 17, 1955
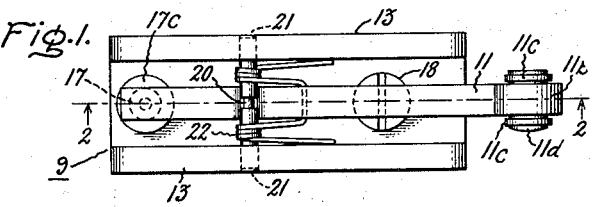
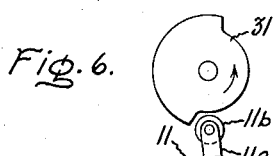
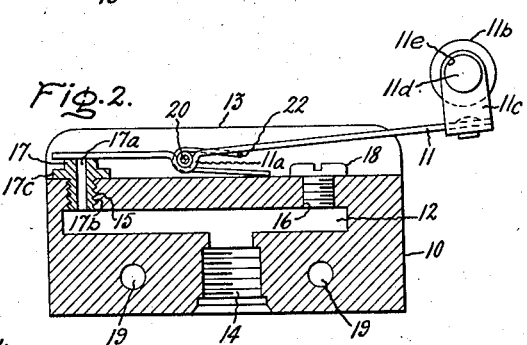
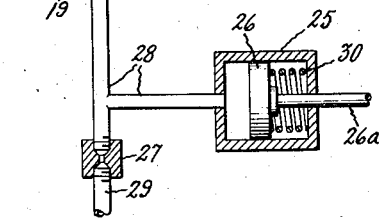
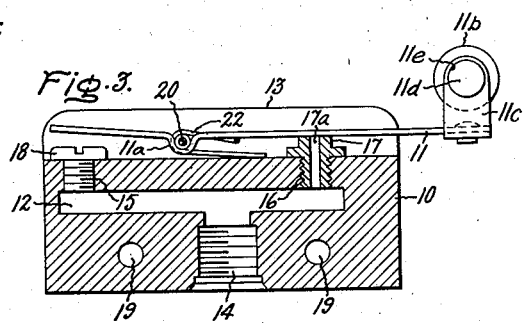
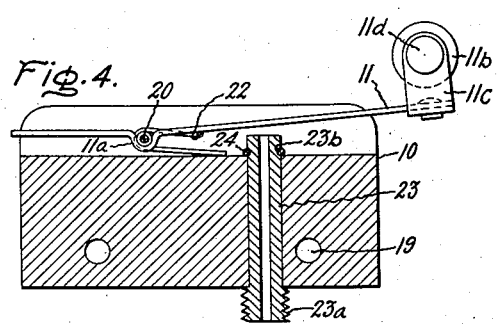
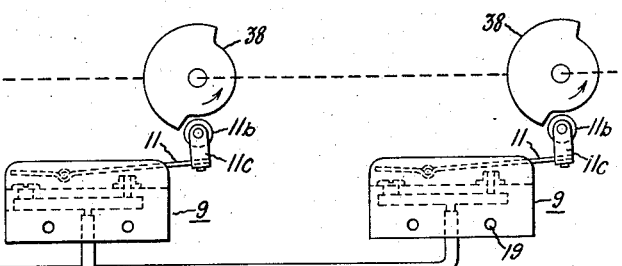
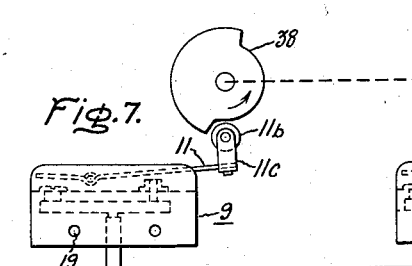
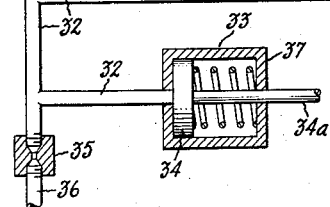
Inventors:
Hugh M. Ogle,
Clyde J. Deavers,
by Merton D. Moore
Their Attorney.

United States Patent Office 2,881,786
Patented Apr. 14, 1959

2,881,786

CONVERTIBLE PNEUMATIC VALVE

Hugh Malcolm Ogle and Clyde Jerome Deavers, Schenectady, N.Y., assignors to General Electric Company, a corporation of New York Application June 17, 1955, Serial No. 516,284

3 Claims. (Cl. 137—270)

This invention relates to pneumatic control components and, more particularly, to pneumatic switches, valves, or actuators for use in pneumatic control circuits.

Systems for remotely controlling the operation of machinery commonly utilize relays or switches which comprise electrical contactors or valves as the control elements. The type of control component selected depends not only upon whether the controlled apparatus is electrically or fluid pressure operated but upon whether a suitable control component usually associated with the particular medium employed is available which will accomplish the result desired and, also, upon the relative cost of available control components. For example, many fluid pressure actuated systems utilize electrical relays or switches and circuits to control pneumatic valves where pneumatic switches and systems could be advantageously employed if pneumatic control elements were available which would perform the required functions, and if such pneumatic components were economically feasible to utilize. Since the life of pneumatic circuits is generally much greater than that of corresponding electrical circuits, the use of such pneumatic circuits wherever possible is highly desirable.

Pneumatic control circuits would be more widely used if a simple, inexpensive, and reliable pneumatic switch or valve were available which could be easily adapted to perform a number of control functions and which were operable from a light actuating force.

Accordingly, it is an object of this invention to provide a simple, inexpensive, reliable, and versatile pneumatic switch which is capable of being simply and easily adapted for either normally open or normally closed operation and which requires only a very small actuating force.

Briefly stated in accordance with this invention, a switch or valve body having a fluid flow passage therethrough is provided and a biased switch arm is pivotally mounted thereon to maintain the fluid flow passage either normally open or normally closed, and to either open or close the fluid flow passage in response to an actuating force in dependence upon whether the fluid flow passage is normally open or normally closed. As illustrated, one means of selectively providing a normally open or normally closed fluid flow passage is to provide two outlets for the fluid flow passage, one of which is under the end of the spring biased switch arm which is biased down against the switch body, and the other of which is under the end of the switch arm which is biased away from the switch body. Thus, by interchanging the positions of a passage closing plug and a nozzle from one opening to the other, the switch may be made normally open or normally closed. Another means of providing normally open or normally closed operation illustrated is to provide a single outlet for the fluid flow passage and provide for reversing the switch arm with respect to the switch body so that in one position the end of the switch arm which is biased down against the switch body is over the opening of the fluid flow passage and for the opposite position the end of the switch arm which is biased away from the switch body is over the fluid flow passage outlet.

The novel features which are believed to be characteristic of this invention are set forth with particularity in the appended claims. The invention itself, however, both as to its organization and method of operation, together with further objectives and advantages thereof, may best be understood by reference to the following description taken in connection with the accompanying drawing, in which:

Fig. 1 is a plan view of a switch embodying the invention with the components thereof arranged to make it normally closed;

Fig. 2 is a sectional side elevation taken along the lines 2—2 of Fig. 1;

Fig. 3 is a sectional side elevation similar to that of Fig. 2 with the switch components arranged to be normally open and shown with the switch arm depressed so that the switch is in its closed position;

Fig. 4 is a side elevational view in section similar to Figs. 2 and 3 but of a different embodiment of the invention and showing the components arranged to that the switch is normally open;

Fig. 5 is a fractional side elevational view in section showing the components of the switch of Fig. 4 arranged for normally closed operation;

Fig. 6 diagrammatically illustrates a typical installation of the pneumatic switch utilized as a force amplifier; and Fig. 7 diagrammatically illustrates a pneumatic circuit wherein a series of normally open switches are utilized in an interlock application.

Figs. 1 and 2 illustrate the pneumatic switch in its normally closed position. As may be seen from those figures, the switch 9 comprises a switch body or base 10 which acts as a mounting for a switch actuating element or arm 11 and is provided with a fluid flow passage 12 therethrough. The switch body, as illustrated, is a simple block member which is rectangular in cross section and is provided with upstanding flanges or edges 13 extending longitudinally thereof at the sides of the upper surface to define a channel which is centrally located with respect to the top of the block and which extends the full length thereof. The upstanding flanges or sides 13 are provided to present a means for mounting the switch arm or actuator.

In the embodiment of Figs. 1, 2 and 3, the fluid flow passage 12 in the switch body extends through an inlet aperture 14 at the bottom, branches longitudinally outwardly within the body, and extends outwardly through the top of the body in a pair of outlet apertures 15 and 16 adjacent opposite ends thereof. When taking a longitudinal section through the center of the switch body, the fluid flow passage defines a T in the body with outlet apertures 15 and 16 extending from the ends of the cross bar of the T up through and into the channel defined by the upstanding flanges 13 along the top of the body. As illustrated, the outlet apertures 15 and 16 are both threaded internally to receive either an externally threaded plug 18 or an externally threaded nozzle 17. In order to permit the entry of an externally threaded fluid carrying conduit, the inlet aperture 14 at the bottom of the switch body is also threaded internally.

As illustrated in Figs. 1 and 2, the nozzle 17 is threaded into the outlet aperture 15 at one end of the switch body and a simple screw type plug 18 is threaded into the outlet aperture 16 at the opposite end of the switch body. The nozzle 17 is provided with a fluid flow passage 17a therethrough, external threads 17b along the bottom portion for entry into the switch body, and an outwardly extending flange 17c around the periphery of its midportion which is adapted to be drawn up flush against the switch body and act as a stop. A pair of apertures 19 are provided which extend transversely through the switch body adjacent the lower portion thereof and on opposite sides of the inlet aperture 14 of the fluid flow passage to provide a convenient means for mounting the switch.

In order to provide a means for mounting a switch arm holding shaft 20 on the switch body, apertures 21 are provided which extend transversely through each of the upstanding flanges 13 in such a manner that the shaft 20 may be extended through both apertures. Fluid flow through the switch body is controlled by means of the switch arm 11 pivotally mounted on the shaft 20 and spring biased in such a manner that one end of the switch arm is urged toward the switch body and the opposite end thereof is urged away from the switch body. The switch arm 11 consists of a flat metal strip having a U-shaped channel 11a bent therein intermediate its ends which U-shaped channel is so proportioned as to fit around the mounting shaft 20. One end of the switch arm is provided with a roller actuating member 11b supported thereon by means of a clevis or U-shaped saddle member 11c stapled, riveted, or fixed by other suitable means to the end of the switch arm, and a shaft 11d extending through apertures 11e in the upper arms of the U-shaped saddle member 11c, and through the roller 11b.

The switch actuator arm 11 is positioned lengthwise of the switch body 10 over the apertures 15 and 16 with the U-shaped channel 11a therein nested around a portion of the shaft 20 on the switch body. The switch actuator arm is held on the shaft 20 by means of the biasing spring 22, which also serves to bias the end of the switch arm 11 which is provided with the actuating roller 11b away from the switch body 10 and the opposite end of the switch arm 11, which may be referred to as the valve end toward the switch body.

In Figs. 1 and 2, the open outlet aperture 15 having the nozzle 17 therein is under the valve end of the switch arm and, therefore, the switch 9 is set up for normally closed operation. Fig. 3 illustrates the pneumatic switch of Figs. 1 and 2 with the positions of plug 18 and nozzle 17 interchanged so that the nozzle is under the end of the switch arm which is normally biased away from the switch body and, therefore, the switch 9 is set up for normally open operation. As illustrated in Fig. 3, however, the switch arm 11 is in its depressed position and, therefore, the switch is closed. Alternatively, the switch arm and spring may be reversed end on end to obtain either normally open or normally closed operation.

A slightly different embodiment of the invention is illustrated in Figs. 4 and 5. In general, the components of the switches shown in Figs. 4 and 5 are the same as the components of the switch illustrated in Figs. 1 through 3, and the corresponding elements are given the same reference numerals for simplicity. The embodiment illustrated in Figs. 4 and 5 differs from that of Figs. 1, 2 and 3 in that the fluid flow passage in the switch body 10 of the switch illustrated in Figs. 4 and 5 extends straight through from the bottom of the switch body up and into the channel between the upstanding flanges 13. Fluid is conducted through this fluid flow passage by means of a nozzle 23 which extends through the entire passage. In order to secure the nozzle 23 in position within the switch body 10, the nozzle is provided with external threads 23a at its lower extremity which are larger than the passage in the switch body and a collar receiving annular groove 23b around the outer periphery of the upper portion of the nozzle. The nozzle 23 is positioned to extend through the switch body into the channel between the upstanding flanges and is held in position by a spring collar 24 in the annular groove 23b.

It will be seen that the switch arm provided for the switch of Figs. 4 and 5 is identical to that previously described, and it will also be seen that this switch arm is pivotally mounted on the switch body 10 in the same manner previously described.

The switch is set up for either normally open or normally closed operation by a simple end on end reversal of the switch arm. As illustrated in Fig. 4, the switch arm 11 is in such a position that the fluid ejecting nozzle 23 is under the actuator end thereof and, therefore, the switch is set up for normally open operation. Fig. 5 shows the switch arm 11 reversed end on end so that the nozzle 23 is under the valve end of the switch arm (i.e., the end which is biased toward the switch body) and, therefore, the switch as shown in Fig. 5 is set up for normally closed operation.

The switch 9 may be used as a force amplifier in the installation shown in Fig. 6. The installation consists of a switch 9 of the type illustrated in Figs. 1 through 3 set up for normally closed operation, a cylinder 25 having a piston 26 biased against motion therein by biasing spring 30, an orifice 27, conduits 28 connecting the orifice 27 to the inlet aperture 14 of the pneumatic switch 9 and to the cylinder 25, and a supply conduit 29 connected to supply the orifice 27 with a fluid under pressure. When a fluid such as air is introduced into the system through the supply conduit 29, the pressure equalizes in all parts of the system. When switch 9 is actuated by depressing the valve end of the switch arm 11, as by interaction of cam 31 and the roller 11b, fluid is vented through the switch nozzle 17 more quickly than it can enter through the orifice 27 and thus a pressure decrease results in the cylinder 25. The spring force exerted on the piston 26 in the cylinder 25 by the biasing spring 30 then becomes greater than that exerted by the fluid pressure and a displacement of the piston 26 results. For the purpose of utilizing the movement and force of the piston 26, a shaft 26a is fixed to the piston 26 and extends out through an end wall of the cylinder 25. A comparatively small force exerted on the roller 11b can thus be amplified greatly to produce a large force at the output shaft 26a. It will readily be appreciated that this mechanical motion may be used for the operation of latches and other such devices.

In Fig. 7, a series of normally open switches 9 are shown in an interlock circuit which could be used as a part of the supervisory control for a sequenced operation. In this illustration, normally open switches 9 such as those illustrated in Figs. 1 and 2 are connected by means of conduits 32 to a cylinder 33, which contains a spring biased piston 34 having a mechanical output shaft 34a, and to an orifice 35 which in turn is supplied from a fluid supply conduit 36. The fluid supply conduit 36 is intended to be connected to a pressurized fluid source such as air.

The switches 9 are all shown as being normally open. For this condition the pressure on the piston side of the orifice 35 is not sufficient to move the piston 34 against its biasing spring 37. If, however, all of the cams 38 are in a position to actuate the switch arms 11 and thus close all of the pneumatic switches 9, the pressure on the piston side of the orifice 35 will build up until it is sufficient to move the piston 34 against its biasing spring 37 and consequently cause a movement of the actuating shaft 34a. It will readily be seen that the pneumatic circuit of Fig. 7 not only provides for sequenced operation but provides force amplification in the same manner as the circuit of Fig. 6.

While the invention has been described by reference to the illustrated embodiments thereof, it will be understood that changes may be made by those skilled in the art without actually departing from the invention. It is, therefore, the aim in the appended claims to cover all such equivalent variations as come within the true spirit and scope of the foregoing disclosure.

What we claim as new and desire to secure by Letters Patent of the United States is:

1. A pneumatic switch comprising a switch body having a fluid flow passage therein with at least one inlet aperture and two spaced outlet apertures, said outlet apertures being on the same side of said switch body, a nozzle in one of said outlet apertures, removable closure means in the other outlet aperture, a switch arm pivotally secured at a point intermediate its ends for rotation about a point intermediate to and on the same side of said switch body as said outlet apertures, and biasing means to urge said switch arm towards one of said outlet apertures, the pivotal mounting for the switch arm including means for effecting end-for-end reversal of said switch arm and said biasing means, said nozzle and closure means being interchangeable to provide a normally open or a normally closed nozzle.

2. The pneumatic switch set forth in claim 1 wherein said switch body has upstanding side flanges on the same side of said switch body as said apertures and means removably securing the pivot point of said switch arm to said flanges thereby to permit the end-for-end reversal of said switch arm and biasing means.

3. A pneumatic switch comprising a switch body having a fluid flow passage therethrough with at least one inlet aperture and at least a pair of outlet apertures, a switch arm operably mounted for pivotal movement on said switch body to selectively open and close one of said outlet apertures, biasing means for urging said switch arm toward one position relative to said switch body, said switch arm and biasing means being reversible relative to said switch body to determine the normal condition of said one outlet aperture, and a closure means closing the other of said outlet apertures, said closure means being adapted to close either of said outlet apertures.

References Cited in the file of this patent

UNITED STATES PATENTS

| | | |
|---|---|---|
| 435,488 | Elton | Sept. 2, 1890 |
| 1,003,694 | Bowyer et al. | Sept. 19, 1911 |
| 2,757,688 | Klinger | Aug. 7, 1956 |